Figure 5:
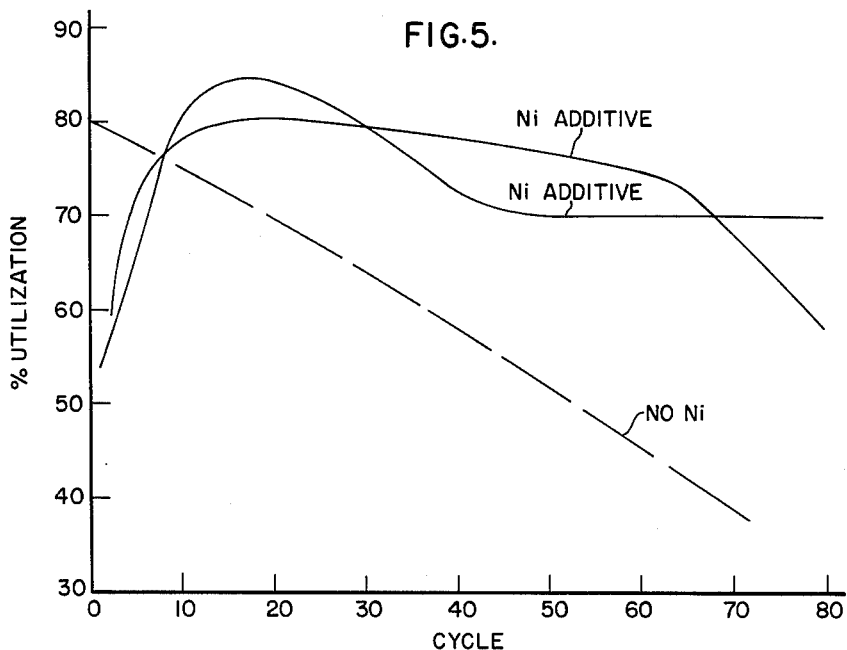

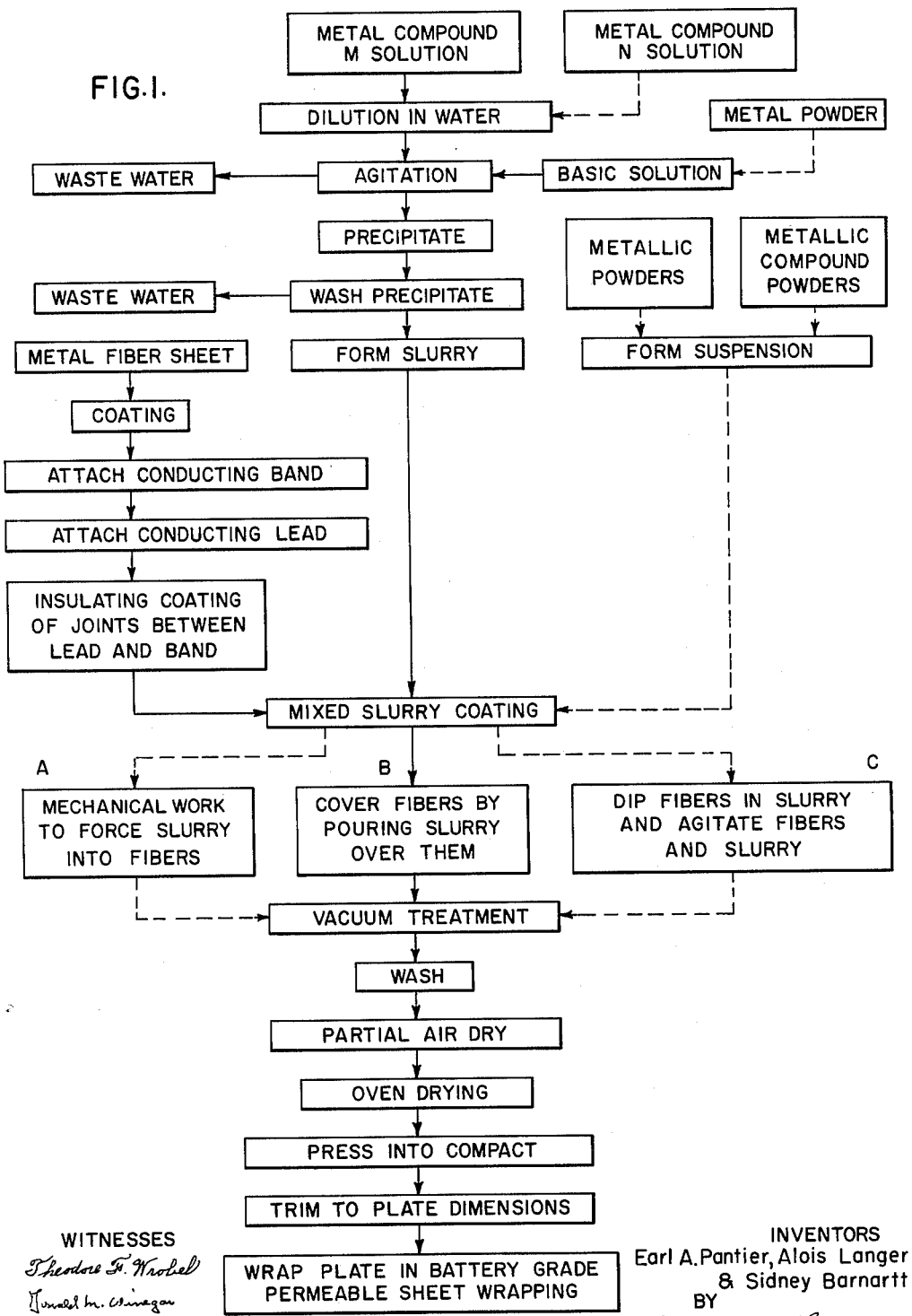

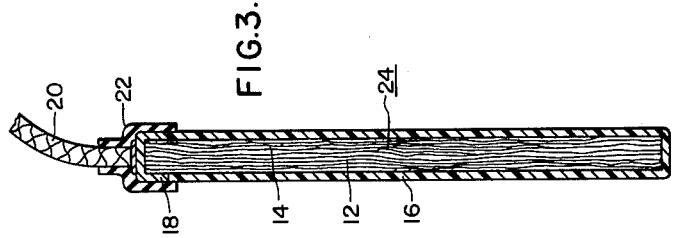
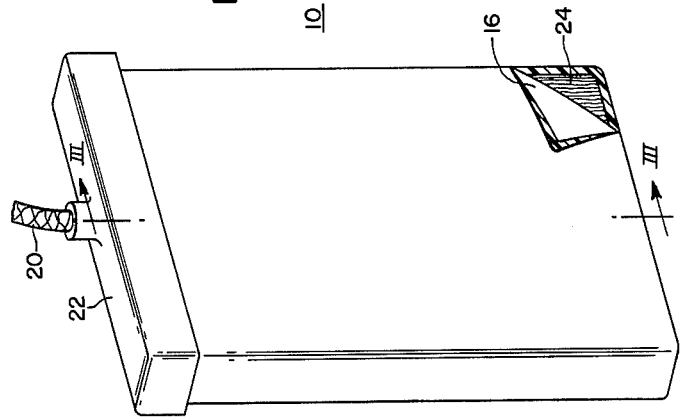
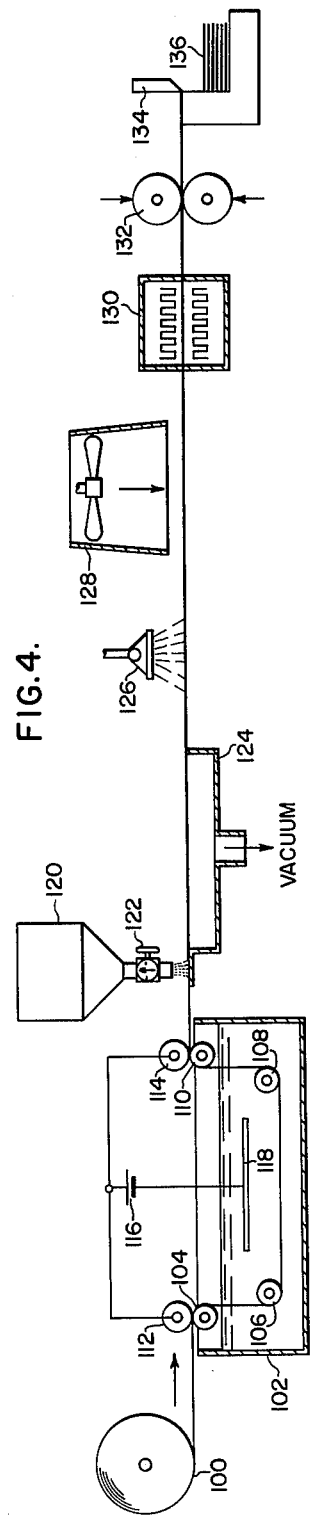

United States Patent Office 3,262,815
Patented July 26, 1966

1

3,262,815
ELECTRODES FOR SECONDARY STORAGE BATTERIES
Alois Langer, Forest Hills, Earl A. Pantier, Penn Hills, and Sidney Barnartt, Monroeville, Pa., assignors to Westinghouse Electric Corporation, Pittsburgh, Pa., a corporation of Pennsylvania
Filed Aug. 11, 1964, Ser. No. 388,844
25 Claims. (Cl. 136—36)

This invention relates to a novel pasted-plate type of electrode suitable for use in secondary storage batteries, a process for making this type of electrode, and secondary storage batteries utilizing the improved electrode.

The efficiency of a storage battery depends upon the surface area of the active electrode material exposed to the electrolyte at any given time. In some instances finely divided electrode material presenting a large surface area is obtained by repeated charging and discharging of the electrodes. This processing is inefficient, time consuming and costly.

Active electrode material has been prepared initially in the form of fine particles which are then pressed together, as exemplified by the pasted electrodes of a lead storage battery. Active electrode material has also been produced by sintering together fine particles as evidenced by the silver electrode of a silver cell.

When the active electrode material is relatively non-conducting, it is often mixed with a powdered, good electrical conductor, as in a dry cell and an Edison battery. In many instances, for reasons of good conductivity and rigidity, the active electrode material is physically supported on a conductive frame, or a metallic mesh, or encapsulated within a conducting envelope having many openings for electrolyte circulation. In most instances such a supporting member weighs more than the active electrode material thereby increasing the overall size and weight of the battery.

It is, accordingly, an object of our invention to provide an improved, more efficient electrode capable of operating at a high total energy density, suitable for secondary storage batteries, and batteries embodying such electrodes.

It is also the object of our invention to provide an improved electrode for secondary storage batteries in which the active electrode material presents a large area and composes a major proportion of the weight of the electrode.

It is the object of our invention to provide an improved electrode for secondary storage batteries in which an active electrode material exposes a large area to the battery electrolyte and is intimately applied to an electrically conducting support comprising intermingled parallel fibrous material, such as steel wool, or graphitized fibers.

It is a further object of our invention to provide a process for making improved and more efficient electrodes for secondary batteries.

It is a still further object of our invention to provide a continuous manufacturing process for producing the improved electrode of this invention.

It is a still further object of our invention to provide batteries utilizing an improved electrode comprising matted fine fibers of metal supporting an active electrode material.

Other objects of the invention will, in part, appear obvious and will, in part, appear hereinafter.

Figure 6:
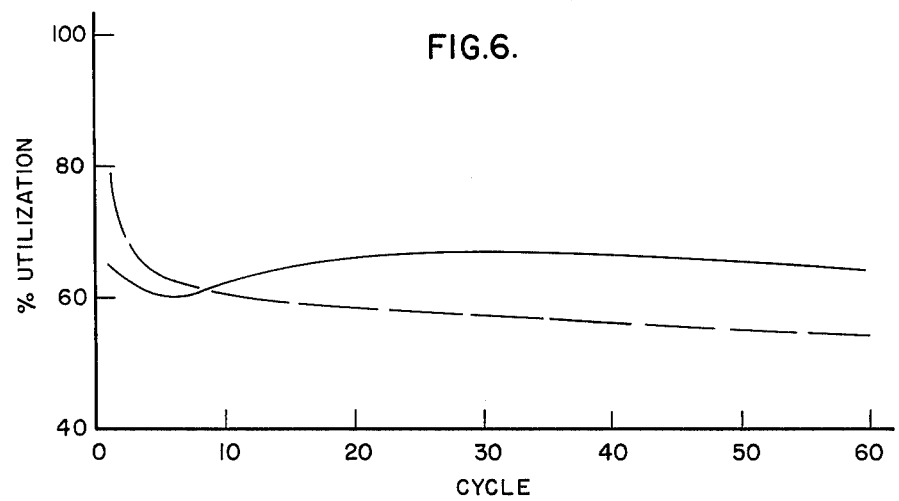
Figure 7:
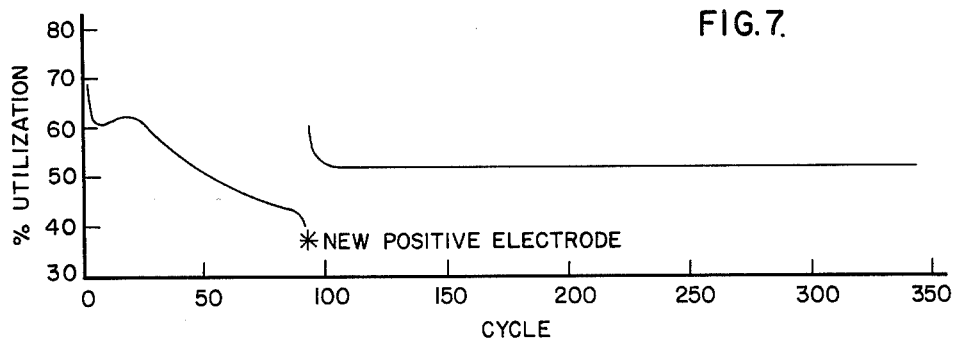
Figure 8:
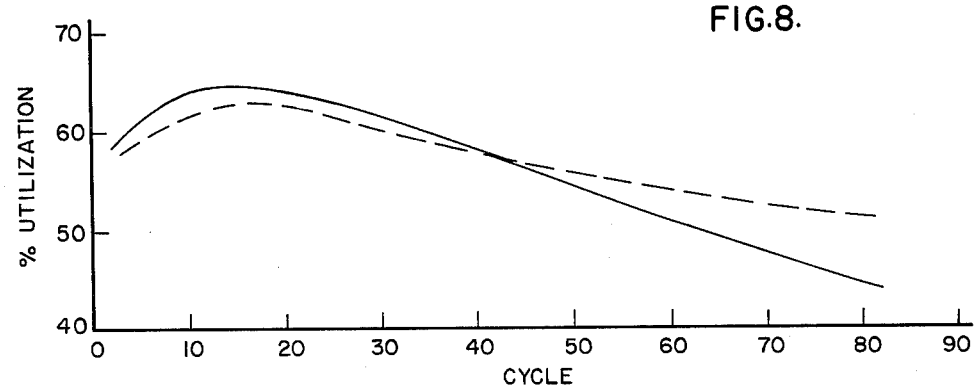
Figure 9:
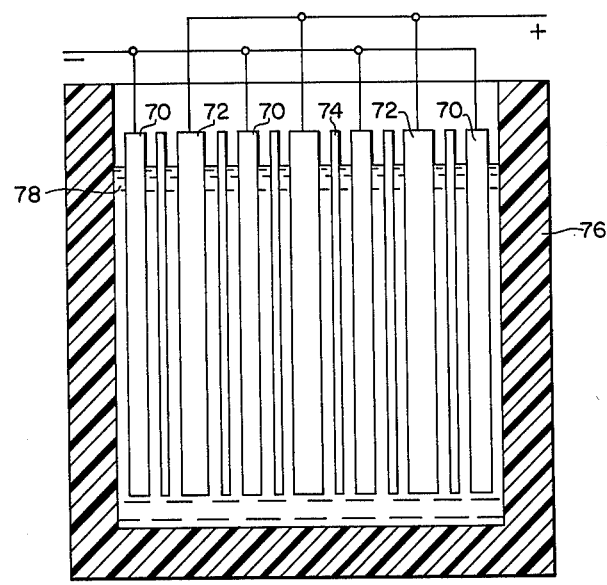

For a better understanding of the nature and objects of the present invention, reference should be had to the following detailed description and drawings, in which:

FIGURE 1 is a flow diagram of a process of making an electrode;
FIG. 2 is a perspective view of a typical electrode;
FIG. 3 is a cross section on the line III—III of FIG. 2;
FIG. 4 is a pictorial representation of a process for producing improved electrodes;
FIG. 5 is a graphical representation of the effect of nickel hydroxide additive to silver oxide electrodes on the percent utilization of active silver;
FIG. 6 is a graphical representation of the full discharge cycling of duplicate cadmium electrodes of the new improved design;
FIG. 7 is a graphical representation showing a cycling test performed on a cadmium electrode of the new improved design;
FIG. 8 is a graphical representation of the full discharge cycling of duplicate nickel electrodes of the new improved design; and
FIG. 9 is a cross section of a battery.

The invention, in one of its broad aspects, comprises a novel pasted type electrode for secondary batteries that comprises (1) a grid of compacted essentially parallel linearly disposed metal fibers, such as steel wool, which fibers may be electroplated with another metal for improved operation, (2) a larger amount by weight of an active electrode material disposed upon and within the interstices of the grid, (3) an electrolyte permeable sheet wrapping enclosing the grid and applied active electrode material, and (4) an electrical lead affixed to the fiber ends of the grid. A continuous process for producing the electrodes in a rapid and economical manner is another feature of the invention.

More particularly, referring to FIGS. 1, 2 and 3, an electrode 10 suitable for secondary storage batteries is produced in which the supporting and conducting structural member comprises a grid 12, of compacted generally parallel intermingled fine conductive fibers, preferably metallic, such as steel wool, which steel wool may be coated, and the fibrous grid 12 is intimately and thoroughly coated and impregnated with one or more layers of active electrode material 14 the whole being in the form of a plate 24. The surfaces of each fiber will be coated, and active electrode material will be disposed in the interstices of the body of fibrous material. Both the positive and negative electrodes may be made using this construction. The difference between the positive and negative electrodes resides in the active electrode material 14 applied and, in some cases, the type of conductive metal fibers forming the grid, or the coatings applied to the metal fibers. A liquid electrolyte permeable insulated sheet wrapping 16 is applied about the outside of the electrode to keep the active electrode material 14 in place and to prevent short circulating growths from forming and contacting adjacent electrodes. An electrical contact, or electrically conductive band 18 is attached to one end of the parallel fibers of the compacted grid 12, and the applied active electrode material 14. An electrical lead 20 is attached to the electrical contact 18 and the resulting joint may be covered with insulation 22, when required.

The compacted fibrous body, or grid, meets three important requirements necessary for an efficient electrode. It has good electrical conductivity, it comprises a supporting structure composed of a great number of closely spaced generally parallel fine conductors of appreciable length presenting a multiplicity of interstices into which active electrode material may be introduced, and has high strength for its weight. It it to be noted that no binder is required to hold the active electrode material together nor is any binder required to create the required intimate electrical conductivity relationship between the active electrode material and the conducting fibers. The individual fibers are also attached to the band and directly supported thereon for maximum current capacity and load supporting ability.

The compacted fibrous body, or grid, also has two distinct advantages over grids produced by methods previously known to those skilled in the art. One of the advantages is the high total energy density obtained with an improved electrode embodying the teachings of this invention. This greater ampere hours per unit weight of active electrode material results from the effective use of the active electrode material at a relatively high output voltage. The second advantage is that total weight of a battery employing the improved grids, or electrodes, will be less than a similar commercial battery made by available conventional means.

The electrical conductivity as well as the electrode characteristics of the grid 12 may be improved by coating the fibers with one or more thin layers of electrically conductive material. In particular, electrodeposits of metals such as copper, nickel, silver, zinc and cadmium help improve the efficiency and life of the electrode.

Extra fine, commercially available steel wool is found to be an unusually suitable and economical grid or body for the electrode construction of the invention. Especially suitable is grade 000 steel wool which is available in the form of a long blanket of generally parallel, intermingled, substantially unidirectional fibers which, when uncompacted, averages approximately ¼ inch in thickness. These parallel intermingled fibers exceed 1½ inches in length, being essentially continuous for the entire length of the electrode grid. The major proportion, over 90% of the fibers, is disposed in a uniformly lineal direction parallel to each other, and are co-mingled and in an electrical conducting relationship with the other fibers about them. Tranversing and co-mingling with the main body of unidirectional fibers are a small number of short metal fibers of various lengths produced during manufacture of the steel wool. This mixture of the metal fibers is designated as heterogeneously intermingled with the majority of the fibers extending in one direction. Good results have been had with steel wool fibers having a diameter ranging from 0.005 millimeter to 0.35 millimeter. The average thickness of the 000 grade of steel wool fibers is 0.02 millimeter. The steel wool is basically a low carbon steel, but may comprise nearly pure iron or other fibrous base metals or alloys such as stainless steel.

Plating the steel wool grid with silver increases the efficiency of an electrode embodying silver oxide as the active electrode material. A grid of solid silver fibers was made using commercially available silver ribbon. Comparison of this solid silver fiber grid with a silver plated steel wool grid showed there was no significant difference in efficiency of the grid. Nickel, Monel or other metal or alloy wool also may be employed for the grid member.

An electrically conducting band, or foil, or metal, may be crimped or otherwise attached to one end of the steel wool electrode grid in electrical contact with the ends of each of the unidirectional fibers, ordinarily prior to the application of active electrode material. Thus, the end of each long fiber is attached to the band so that electrical current can flow efficiently from the lead to each fiber. To this conducting band, a heavy lead is attached by mechanical means, brazing, soldering or the like. In some cases, the electrical lead may be threaded, soldered or otherwise directly attached to the lineal fibers of the steel wool grid of the electrode without the use of the conducting band.

Many different procedures may be employed for producing and applying active electrode material upon the surface, and within the interstices, of the fibrous body. FIG. 1 shows schematically a technique suitable for practicing the invention. Excellent results are secured when a slurry of the active electrode material is applied to the fibrous body as a paste or strained therethrough with the particles retained in the fine interstices. Other methods may be employed to apply the active electrode material to the fibrous body such as dipping the grid in a suspension of active electrode material; dispersing the active electrode material in a volatile solvent and depositing the electrode material on the fibers dipped therein by evaporating the solvent; precipitating active electrode material from solution while the fiber metal grid is disposed therein; and by electroplating or electrophoretic depositing of active electrode material on the fibrous body.

In FIG. 1 a method of preparing the active electrode material is represented by the flow diagram connected by the solid line arrows. An alternate method of producing the active electrode material is represented by the flow diagram connected by the broken line arrows. Two alternate methods of applying the active electrode material are shown and are lettered A and C.

In a preferred method of preparing the active electrode material, a concentrated solution of metal component M, prepared by the electrode manufacturer or purchased on the commercial market, is diluted by additions of distilled water to the desired active metal concentration. Should co-precipitation of an additive be desired, the required amount of metal component N solution is added at this point and further dilution with distilled water to the required active metal concentration is performed at this time. The diluted metal components solution is agitated, and during the agitation period, the required amount of basic solution, normally potassium hydroxide with or without lithium hydroxide since the preferred battery electrolyte is potassium hydroxide, is introduced into the agitated diluted metal components solution. The resulting precipitate, or active electrode material, is allowed to settle, and the supernatant liquid is decanted. The precipitate is washed several times with distilled water and the waste water discarded each time after allowing the precipitate to settle. The end product is a slurry of the desired active electrode material.

An alternate method of producing the active electrode material utilizes metallic powders and metallic compound powders. These powders may be manufactured as needed or obtained commercially. The required amount of one or more metallic powders or metallic compound powders is suspended in distilled water, thoroughly agitated to mix the one or more powders when necessary, and the powder or mixed powders allowed to settle out of suspension. The supernatant liquid is decanted and the resulting slurry contains the active electrode material.

In the making of an improved electrode utilizing cadmium hydroxide with carbon as an additive, a modification of the preferred method of producing active electrode material is employed. To obtain an excellent mixture of cadmium hydroxide and carbon as the active electrode material, the carbon, in a powder form such as carbon black, is added to water and by agitation, such as a rapid stirring motion, a suspension of powdered carbon in water using a wetting agent to get good wetting is obtained. This suspension is then immediately added to the diluted metallic compound solution of cadmium which is then reacted with a basic solution and the carbon is taken out of suspension by the precipitating cadmium hydroxide resulting in a mixture of active electrode material ingredients of carbon and cadmium hydroxide.

Additives, in the form of metallic powders and metallic compound powders, may be admixed mechanically with dried precipitate prepared by the preferred method of manufacturing active electrode material. The resulting mixture may then be suspended in distilled water and the mixture of active electrode materials is allowed to settle. The excess distilled water is decanted and the resulting slurry containing the active electrode materials is ready for application to the fibrous grids.

Other suitable methods of preparing active electrode material containing one or more metals and metallic compounds should be self-evident to those skilled in the art.

Although three methods are shown in FIG. 1 for the application of active electrode material upon and within the multiplicity of interstices of the fibrous grid, a preferred method is that indicated by the letter B, the method comprising the pouring of the slurry over the fibrous grid. Mechanical working of the slurry into the fibrous grid, method A, is more time consuming than method B. Method C provides for the immersing of the fibrous grids in a slurry of active electrode material and agitating the grid within the said slurry of active electrode material or agitating the slurry bath itself to fill all the interstices of, and to coat the metallic fibers of, the grid. A desirable manufacturing process would be to incorporate portions of all three methods, A, B and C, to coat and impregnate the fibrous grid. This combined method would consist of providing a bath of active electrode material in a constant state of agitation, much like the fluidized bed method for the resin coating of materials, dipping the grid into the agitated slurry in the bath, covering the grids as they emerge from the bath with an additional slurry of the same active electrode material and then mechanically working the slurry into the grid, and finally compacting the treated fibrous grid and active electrode material prior to the drying operation.

The fibrous body and the applied active electrode material are compacted into a flat or suitably shaped thin plate or other shape having a relatively dense structure with a very large surface area of active electrode particles in relation to the superficial area of the electrode. This compacted plate electrode has the necessary rigidity and a high electrical conductivity for storage battery use, and allows for the making of a simplified external electrical connection to the fiber ends without the need of heavy bolts or screws. The compacted electrode plate is wrapped or coated with at least one layer of a sheet liquid electrolyte permeable battery-grade insulating material such as nylon, regenerated cellulose, polypropylene or other insulating material which will withstand the battery electrolyte. It is then ready to be immersed in a liquid electrolyte with one or more electrodes and used as a rechargeable cell or battery.

The improved electrode is characterized by a uniformly high activity of the active electrode material. The electrode does not have to be repeatedly charged and discharged to attain a high efficiency. The improved electrode also has a high reaction rate per unit area as well as per unit weight along with a high percentage of reaction of the active electrode material before polarization of the electrode becomes excessive.

As mentioned previously, steel wool is available commercially in a desirable form for use in making electrode grids. The manufacture of steel wood is adaptable to producing the steel wool in a large roll of blanket form, much like coils of sheet steel, and therefore a continuous manufacturing process for producing improved electrodes is feasible.

FIG. 4 is illustrative of a possible continuous manufacturing process which may be utilized to produce improved plates and utilizing rolls of steel wool. A blanket 100 of steel wool after being degreased and cleaned, for example in an alkali cleaning fluid, as is well known in electroplating, is fed from its supply roll and passes through an electroplating tank 102 over rolls 104, 106 and 108. Electrically conductive rolls 112 and 114 supplied with electrical current from source 116 from which the anode current goes to anodes 118 whereby the steel wool is plated with at least one coating of electrically conducting metal. A slurry of active electrode material is then deposited from a tank 120 through a metering disperser 122 to apply a layer thereof on top of the plated steel wool. A vacuum is applied to the steel wool as it passes over a manifold 124 in order to work the active electrode material into the interstices of the plated wool grid. The impregnated grid is then washed by water sprays 126, partially dried by air being blown by fan 128, and finish dried in an oven 130. Next, the dried impregnated grid is compacted by rolls 132. The impregnated grid is cut by knife 134 and a stack 136 of the desired plates is produced. Thereafter the plates are wrapped in a permeable insulating sheet material capable of withstanding the liquid electrolyte with a metal foil crimped or otherwise attached to the fiber ends to provide the necessary electrical connection and a lead wire is mechanically joined, brazed, soldered, or welded thereto. The end result is an electrode of the improved design which is the object of this invention.

One advantage of this invention is the very high weight proportion of active electrode material available in relation to the weight of the electrode grid. The optimum weight ratio is found to be approximately 4 grams of active electrode material per 25 milligrams of steel wool grid. This is a ratio of one hundred and sixty parts of active electrode material to one part of the supporting grid weight.

Suitable basic active electrode material for improved positive electrodes are silver oxide, nickel hydroxide, indium hydroxide and iron hydroxide. The suitable basic active electrode material for improved negative electrodes are zinc hydroxide and cadmium hydroxide.

Certain metal compound additives may be and preferably are incorporated in the active electrode material since they will improve the electrode functioning by preventing, or retarding, any portion of the active material from becoming coated with inert material during use and by increasing electrical conductivity between particles, as well as helping produce finer particles of active electrode material.

The effect of several additives in combination with the active electrode material was studied and showed a substantial improvement in the efficiency of the improved electrodes.

The percentage of weight of the additive may be up to 25 percent of the active electrode material the quantity being determined by the type of electrode desired as well as the additive material to be incorporated. This percentage is determined by the ratio of the weight of metal in the additive to the weight of the active metal in the active electrode material. The presence of the additives to the weight of active electrode material metal in amounts exceeding 10 percent apparently did not result in improvements in the electrodes over the benefits at the 10 percent level. The best overall results were secured when there was less than 10 percent of additive by weight, particularly from 2 percent to 8 percent by weight of the additive. It will be understood that two or more additives may be employed simultaneously.

For silver oxide electrodes, additives of copper hydroxide, nickel hydroxide, cobalt hydroxide and palladium hydroxide with a weight ratio of metal to active silver up to 0.08 showed beneficial effects on the silver electrode and improved the cycling characteristics in some cases. One method used was to co-precipitate the additive and the principal active electrode material from an admixture of reacting aqueous solutions of the desired compounds by introducing potassium hydroxide solution. This method provides a very fine precipitate of active electrode material intimately admixed with the precipitated additive.

The addition of copper to silver oxide is an example of the effect which occurs in the particle size of the active electrode material. Without the additive, the silver oxide settles rapidly in the form of large brown flakes. When copper, as copper hydroxide, is added, the precipitate becomes darker in color and settles slowly due to the formation of much finer particles. Using this fine silver oxide-copper hydroxide co-precipitate, the resulting electrode showed an increase in efficiency. The optimum amount of copper is found to be a weight ratio of copper to active silver of about 0.04.

The addition of copper, as a copper hydroxide additive to a silver oxide electrode, wherein the steel wool grid is plated with silver, results in a significant increase in efficiency of the silver oxide electrode when compared to unplated steel wool. However, a further increase in efficiency for the electrode is noted when a copper strike plating is employed beneath the silver plating on the steel wool grid, even without the copper additive in the active electrode material of silver oxide. The greater efficiency exhibited by the copper strike under the silver plate alone is believed to result from a more complete coverage of steel with copper in the appropriate cyanide plating baths.

Therefore, the combination of the copper strike plating beneath the silver plate and the presence of copper as an additive to the active electrode material of silver oxide produces an excellent improved electrode for secondary storage batteries.

An excellent electrode embodying materials and methods as set forth in this invention is obtained when nickel in the form of nickel hydroxide is used as an additive in a silver oxide electrode. The construction is the same as hereinbefore described for an improved silver oxide electrode. The nickel hydroxide is coprecipitated with the silver oxide and the weight ratio of nickel to active silver up to 0.1 showed good results. A good representative ratio value was found to be 0.04.

A nickel hydroxide electrode is a very good example of the improved type of electrode. The steel wool grid is first plated with nickel. Nickel hydroxide is employed as the active electrode material. This electrode proved to have excellent electrode efficiency and recycling life.

In producing a cadmium hydroxide electrode, carbon is usually used as an additive active electrode material, and the mixing of the materials while suspended in water proves to be the more advantageous. Additions in amounts of up to 100 percent by weight of carbon to active cadmium metal produces good results. The optimum weight ratio of carbon to active cadmium metal is about 25 percent.

In determining the efficiency of an improved electrode, cells were constructed for cycling the test electrodes. The efficiency is expressed as the ratio of the measured ampere hours of the cell in comparison with the theoretical ampere hours of the cell based upon the known amount of active electrode material in the test electrode. The ampere hours of the test cell is obtained by discharging the cell through a calibrated resistor to a preselected end voltage, usually one volt.

The percent utilization of a test electrode is determined by comparing the ampere-hour output capacity of the test electrode with the theoretical ampere-hour capacity of the active electrode material incorporated in the test electrode of the test cell.

The test cell is given a standard charge during each cycle equivalent to 100 percent of capacity of the electrode undergoing test. The discharge is terminated manually when the discharge potential of the cell drops to 1.00 volt. The second electrode of the test cell is made in accordance with the teachings of the present invention always containing an excess of active electrode material so that the output capacity is governed by the active electrode material of the test electrode only.

In further accord with this invention, batteries consisting of a plurality of anodes and cathodes were made, encased in a suitable container, electrolyte introduced, and, through the electrical connections provided on the battery, cycled through charging and discharging periods.

The principal batteries studied consist of positive plates containing active electrode material of silver oxide, silver oxide with additives, or nickel hydroxide and of a negative electrode containing active electrode material of cadmium hydroxide with additive material. Other potential battery electrodes which can be utilized are negative plates containing iron hydroxide and zinc hydroxide. The battery combinations therefore are numerous since any combination of a previously mentioned positive plate may be coupled with any mentioned negative plate to form a cell, and a multiplying of cells may be employed to produce a battery.

*Example I*

Referring to FIGS. 2 and 3, a positive plate incorporating silver oxide as the active electrode material was made in the following manner:

A sheet of steel wool weighing approximately 17 mg./cm.$^2$ was first given a thin copper strike (6 mg./cm.$^2$) from a cyanide electroplating bath. It was then electroplated with a smooth adherent layer of silver (approximately 27 mg./cm.$^2$) from a silver cyanide plating bath.

A grid 3" x 2.75" was then cut from the plated sheet. An electrical lead 20 made from a silver wire, was clamped mechanically to the fiber ends of the grid 12 by use of a folded nickel strip 18. The grid 12 was then positioned on a 3.5" x 3.5" Whatman No. 7 filter paper laid over the porous bed of a 3" square Büchner funnel.

A precipitate of silver hydroxide was made by taking 50 ml. of 0.742 molar silver nitrate solution (containing 4.00 grams of silver) and rapidly adding an excess of 7 molar aqueous potassium hydroxide solution to precipitate the silver hydroxide completely. The precipitate was then allowed to settle and the supernatant liquid was decanted. The precipitate was then washed three times with 200 ml. of distilled water, the precipitate being allowed to settle each time. The water was decanted each time. The slurry remaining was then poured over the plated steel wool and by applying a slight vacuum, filtration occurs. The precipitate was again washed with water and partially air dried. The result was a plate having well dispersed electrode material of silver oxide 14 on and within the grid 12 of plated steel wool.

The partially dried plate was then placed between several layers of thick filter paper in a hydraulic press. Pressure was applied slowly until approximately 600 p.s.i. was obtained. The compacted plate was wrapped in two layers 16 of 1 mil thick liquid permeable regenerated cellulose. The final electrode 10 is illustrated in FIG. 2. The electrode has about 160:1 ratio of active electrode material to the metal fiber body.

*Example II*

An improved silver oxide electrode suitable for use in secondary storage batteries was produced embodying the teachings of this invention and made in the same manner previously disclosed in Example I except that nickel was employed as an additive. The nickel was coprecipitated with the silver oxide as nickel hydroxide with a weight ratio of nickel to active silver of 0.044.

The efficiency of this electrode was as high at 80 percent and remained above 70 percent efficiency for 80 consecutive cycles of charging and discharging. This is an outstanding result in rechargeable batteries.

FIG. 5 is a graph comprising the present utilization of active silver in two electrodes prepared by the method described in Example II and a silver electrode prepared by the method described in Example I. The nickel to active silver weight ratio was 0.044. It was noted that both silver electrodes with a nickel additive achieved 80 percent or better utilization of their active silver content and exceeded 70 percent utilization of their active silver content for more than 60 cycles. During each cycle the electrode was discharged to 1.0 volt. The negative electrode was of the improved cadmium design and contained excess cadmium.

Example III

A cadmium hydroxide cathode, a negative plate, was made in the following manner:

The steel wool sheet (000 fineness) was prepared in a like manner as the electrode in Example I, except that the plating on the steel wool was a single layer deposit of cadmium in an amount of approximately 35 mg./cm.$^2$.

The active electrode material was prepared in the following manner:

An excess of 7 molar potassium hydroxide was added to 50 ml. of 0.712 molar cadmium hydroxide solution by rapid stirring. The resulting precipitate was treated in the same manner as the silver oxide precipitate in the silver oxide electrode in Example I.

FIG. 6 is a graph showing the percent utilization of active cadmium of two electrodes made in accordance with the process outlined in Example III hereinbefore described. The results were obtained by cycling the cadmium electrodes in test cells with silver oxide electrodes of the new design, the silver oxide electrodes having an excess capacity of silver.

Example IV

A cadmium hydroxide cathode, with carbon as an additive in the active electrode material, was made in the same manner as the electrode in Example III except that the 50 ml. of 0.712 molar cadmium hydroxide solution contained approximately 1 gram of carbon black in suspension.

FIG. 7 is a cycling test performed on the improved cadmium electrode with carbon as an additive material. The percent utilization of cadmium remained constant at 52±3 percent for more than 340 cycles. Each cycle consists of discharging the electrode test cell to 1.00 volt. The erratic portion at the beginning of the test cycles resulted from failure of the lead of the positive electrode which was replaced before the start of the ninety-second cycle.

Example V

Improved electrodes suitable for use in a secondary storage battery were constructed in which the active electrode material was nickel hydroxide. The electrodes were constructed in a manner similar to that previously described in Example I, except that a nickel-plated steel wool grid was used.

The improved electrodes of nickel hydroxide gave excellent results. FIG. 8 is a graphical representation of the full-discharge cycling of duplicate nickel electrodes of the new improved design in test cells having a negative plate of cadmium with excess capacity of cadmium. The cells were discharged to the 1.0 volt level and the percent utilization of active nickel remained 50 percent or greater for more than 60 cycles.

Example VI

Batteries were constructed with a plurality of negative plates 70 in parallel, a plurality of positive plates 72 in parallel, separators 74, a battery case 76, and electrolyte of potassium hydroxide 78 as shown in FIG. 9.

The batteries prepared in accordance with the examples above, exhibited a performance comparable to the best batteries produced by prior methods known to those skilled in the art, and owing to the advantages of their construction involving steel wool, weigh far less per unit of energy.

It is intended that the foregoing description and drawings be interpreted as illustrative and not in limitation of the invention.

We claim as our invention:

1. An electrode suitable for a secondary battery comprising a plate formed from a compact body of intermingled fine metal fibers, the majority of said fibers extending the full height of the plate and a small proportion extending transverse thereto, the fine metal fibers having a generally parallel lineal orientation in one direction and an active electrode material distributed on and disposed within the body of the metal fibers, a liquid electrolyte permeable sheet wrapping enclosing the plate, an electrical contact attached to the plate transverse to the general lineal orientation of the fine metal fibers whereby most of the fibers are directly connected thereto, an electrical lead attached to the electrical contact, and an insulated covering about the lead and the contact.

2. An electrode as set forth in claim 1 wherein the active electrode material comprises at least one material selected from a group consisting of carbon, silver, cadmium, cadmium hydroxide, silver oxide, copper hydroxide, nickel hydroxide, cobalt hydroxide, palladium hydroxide, zinc hydroxide, iron hydroxide and indium hydroxide.

3. An electrode suitable for use in a secondary battery comprising a plate formed from a compact body of intermingled fine metal fibers, the majority of said fibers extending the full height of the plate and a small proportion extending transverse thereto, the fine metal fibers having a generally parallel lineal orientation in one direction, and an active electrode material distributed on and disposed within the body of the metal fibers, a liquid electrolyte permeable sheet wrapping enclosing the plate, an electrical contact attached to the plate transverse to the general lineal orientation of the fine metal fibers whereby most of the fibers are directly connected thereto, and an electrical lead attached to the electrical contact.

4. An electrode as set forth in claim 3 wherein the active electrode material comprises at least one material selected from a group consisting of carbon, cadmium hydroxide, silver oxide, copper hydroxide, metal hydroxide, cobalt hydroxide, palladium hydroxide, zinc hydroxide and iron hydroxide.

5. An electrode suitable for an alkaline secondary battery comprising a plate comprising a compact body of heterogeneously intermingled metal fibers with the majority of said fibers extending the full height of the plate, the fine metal fibers having a generally parallel lineal orientation in one direction, metal plated on the fibers, and an active electrode material distributed upon and within the body of the plated metal fibers, a permeable sheet wrapping enclosing the plate, an electrical contact attached to the plate transverse to the general lineal orientation of the fine metal fibers whereby most of the fibers are directly connected thereto, and an electrical lead attached to the electrical contact.

6. An electrode as set forth in claim 5 wherein the metal plated on the fibers comprises a first coating of copper and an outer coating of silver.

7. An electrode suitable for an alkaline secondary battery comprising a plate comprising a compact body of heterogeneously intermingled ferrous metal fibers with the majority of said fibers extending the full height of the plate, the fine metal fibers having a generally parallel lineal orientation in one direction, a first plated layer of copper and an outer plated layer of silver on the fibers and an active electrode material comprising silver oxide applied to the body of plated ferrous fibers, at least one layer of permeable regenerative cellulose enclosing the plate, a conducting connector attached to one end of the plate transverse to the general lineal orientation of the fine metal fibers whereby most of the fibers are directly connected thereto, an electrical lead attached to the connector, and an insulation applied to the joint formed by the lead with the connector.

8. An electrode as set forth in claim 7 in which the electrode material includes an amount of up to 8.0 percent by weight of at least one additive compound of a metal from the group consisting of copper, cobalt, nickel and palladium.

9. An electrode as set forth in claim 7 in which the electrode material consists of a mixture of silver oxide and nickel hydroxide with a nickel to active silver weight ratio up to 0.08.

10. An electrode as set forth in claim 7 in which the electrode material consists of a mixture of silver oxide and nickel hydroxide with a nickel to active silver weight ratio of 0.044.

11. An electrode as set forth in claim 7 in which the electrode material consists of a mixture of silver oxide and cobalt hydroxide with a cobalt to active silver weight ratio up to 0.08.

12. An electrode as set forth in claim 7 in which the electrode material consists of a mixture of silver oxide and palladium hydroxide with a palladium to active weight ratio up to 0.08.

13. An electrode as set forth in claim 7 in which the electrode material consists of a mixture of silver oxide and copper hydroxide with a copper to active silver weight ratio up to 0.08.

14. An electrode as set forth in claim 7 in which the electrode material consists of a mixture of silver oxide and copper hydroxide with a copper to active silver weight ratio of 0.043.

15. An electrode suitable for an alkaline secondary battery comprising a plate comprising a compact body of heterogeneously intermingled ferrous metal fibers with the majority of said fibers extending the full height of the plate, the fine metal fibers having a generally parallel lineal orientation in one direction, a layer of plated cadmium on the fibers and active electrode material comprising essentially cadmium hydroxide applied to the body of plated ferrous metal fibers, at least one layer of permeable regenerated cellulose, and having a conducting connector attached to one end of the plate comprising an electrical connection made of a nickel band transverse to the general lineal orientation of the fine metal fibers whereby most of the fibers are directly connected thereto, a nickel lead attached thereto, and the joint between the nickel band and the nickel lead insulated by a coating of insulating material.

16. An electrode suitable for an alkaline secondary storage battery comprising a plate comprising a compact body of heterogeneously intermingled ferrous metal fibers with the majority of said fibers extending the full height of the plate, the fine metal fibers having a generally parallel lineal orientation in one direction, a plated layer of nickel on the fibers and an active electrode material comprising nickel hydroxide applied to the body of plated ferrous fibers, at least one layer of permeable regenerative cellulose enclosing the plate, a conducting connector attached to one end of the plate transverse to the general lineal orientation of the fine metal fibers whereby most of the fibers are directly connected thereto, and an electrical lead attached to the connector.

17. An electrode as set forth in claim 15 wherein small amounts of finey divided carbon are admixed in the cadmium hydroxide comprising the active electrode material with a carbon to active cadmium weight ratio of 1.00.

18. In the process of producing an electrode for a battery, the steps comprising:
(1) continuously dispensing from a supply source a sheet of heterogeneously intermingled metal fibers,
(2) coating a sheet of heterogeneously intermingled metal fibers with at least one thin layer of a metal from a group comprising copper, silver, nickel, zinc and cadmium,
(3) coating and impregnating the metal coated sheet of metal fibers with a slurry of at least one finely divided metal compound of the group consisting of the oxides and hydroxides of at least one metal selected from the group consisting of silver, zinc, nickel and cadmium to fill all the interstices of the metal fiber sheet,
(4) drying the coated metal fiber sheet,
(5) compacting the dried sheet,
(6) cutting the compacted sheet into a plate,
(7) wrapping the plate in electrolyte permeable sheet insulation,
(8) attaching a band of electrically conducting material to one edge of the plate transverse to the general lineal orientation of the fine metal fibers whereby most of the fibers are directly connected thereto,
(9) attaching an electrical lead to the electrically conducting band, and
(10) insulating the joint between the lead and the band formed in step (9).

19. In the process of producing an electrode for a battery as set forth in claim 18 wherein: the coating as set forth in Step 2 is electrodeposited, and the slurry set forth in Step 3 is a finely divided mixture comprising at least one metal selected from the group consisting of silver, zinc, nickel and cadmium and at least one compound of a metal selected from a group consisting of copper, nickel, cobalt and palladium to fill all the interstices of the metal fiber sheet.

20. A secondary storage battery comprising a casing within which is disposed:
(1) at least one positive plate comprising:
(a) a compact body of intermingled fine metal fibers, the majority of said fibers extending the full height of the plate, the fine metal fibers having a generally parallel lineal orientation in one direction, and an active electrode material distributed upon and disposed within the body of the metal fibers,
(b) an electrolyte permeable insulating sheet wrapping enclosing the body, and
(c) an electrical lead attached to the body,
(2) at least one negative plate comprising:
(a) a compact body of intermingled fine metal fibers, the majority of said fibers extending the full height of the plate, the fine metal fibers having a generally parallel lineal orientation in one direction, and an active electrode material distributed on and disposed within the body of the metal fibers,
(b) an electrolyte permeable sheet insulation wrapping enclosing the body, and
(c) an electrical lead attached to the body,
(3) a separator between the plates,
(4) an alkaline electrolyte, and
(5) means for making electrical connections to the respective plates.

21. A secondary storage battery as set forth in claim 20 in which the positive plate comprises an active electrode material of a compound of a metal selected from a group composed of silver and nickel, in which the negative plate comprises an active electrode material of a compound of a metal selected from a group composed of cadmium, zinc and iron, and the electrolyte is potassium hydroxide.

22. A secondary storage battery as set forth in claim 20 in which the active electrode material on the positive plate comprises a compound of silver, the negative plate comprises a compound of cadmium, and the electrolyte is potassium hydroxide.

23. A secondary storage battery as set forth in claim 20 in which the positive plate comprises a compound of nickel, the negative plate comprises a compound of cadmium, and the electrolyte is potassium hydroxide.

24. A secondary storage battery as set forth in claim 20 in which the positive plate comprises a compound of silver, the negative plate comprises a compound of zinc, and the electrolyte is potassium hydroxide.

25. A secondary storage battery as set forth in claim 20 in which the positive plate comprising a compound of nickel, the negative plate comprises a compound of iron, and the electrolyte is potassium hydroxide.

(References on following page)

References Cited by the Examiner

UNITED STATES PATENTS

| | | | |
|---|---|---|---|
| 2,234,732 | 3/1941 | Haunz | 136—74 |
| 2,727,083 | 12/1955 | Hollman et al. | 136—31 |
| 2,810,008 | 10/1957 | Bikerman | 136—125 |
| 2,902,530 | 9/1959 | Eisen | 136—120 |

References Cited by the Applicant

UNITED STATES PATENTS

| | | |
|---|---|---|
| 2,501,673 | 3/1950 | Glassner. |
| 2,561,943 | 7/1951 | Moulton et al. |
| 2,610,220 | 9/1952 | Brennan. |
| 2,616,165 | 11/1952 | Brennan. |
| 2,640,864 | 6/1953 | Fischbach et al. |
| 2,708,683 | 5/1955 | Eisen. |
| 2,794,845 | 6/1957 | Grabe. |
| 2,810,008 | 10/1957 | Bikerman. |
| 2,902,530 | 9/1959 | Eisen. |
| 2,931,846 | 4/1960 | Cunningham et al. |
| 2,977,401 | 3/1961 | Marsal et al. |
| 3,137,594 | 6/1964 | Bikerman. |

WINSTON A. DOUGLAS, *Primary Examiner.*

A. SKAPARS, *Assistant Examiner.*